United States Patent
Thompson

[11] 3,805,908
[45] Apr. 23, 1974

[54] ARTICULATED LOADER

[75] Inventor: Richard H. Thompson, Owatonna, Minn.

[73] Assignee: Owatonna Manufacturing Company Inc., Owatonna, Minn.

[22] Filed: Feb. 9, 1972

[21] Appl. No.: 224,673

[52] U.S. Cl.............. 180/51, 180/52, 180/66 R, 180/79.2 B, 280/111, 180/89
[51] Int. Cl........................ B62d 9/00, B62d 37/00
[58] Field of Search......... 180/51, 52, 66 R, 79.2 B; 280/111

[56] References Cited
UNITED STATES PATENTS

| | | | |
|---|---|---|---|
| 3,326,312 | 6/1967 | Buller | 180/51 |
| 3,426,720 | 2/1969 | Enos | 280/111 |
| 3,521,720 | 7/1970 | Korotkin | 180/79.2 B |
| 3,007,590 | 11/1961 | Mathew et al. | 180/51 X |
| 3,685,853 | 8/1972 | Goldsmith | 280/81 R |
| 3,303,901 | 2/1967 | Scholl | 180/66 R |
| 3,161,246 | 12/1964 | Meeker et al. | 180/66 R X |
| 2,807,935 | 10/1957 | Lapsley | 180/66 R X |
| 3,349,932 | 10/1967 | Wagner | 180/51 UX |
| 3,451,494 | 6/1969 | Kowalik | 180/51 X |
| 3,101,806 | 8/1963 | Salna | 180/52 |
| 3,563,329 | 2/1971 | Licari | 180/51 |
| 3,236,325 | 2/1966 | Garrett | 180/51 |

*Primary Examiner*—Kenneth H. Betts
*Assistant Examiner*—John P. Silverstrim
*Attorney, Agent, or Firm*—Merchant, Gould, Smith & Edell

[57] ABSTRACT

A main frame and a pair of drive wheel mounted front and rear subframes, the main frame overlying the rear subframe and pivotally mounted thereon on a generally horizontal axis extending longitudinally of the direction of travel of the loader. The front subframe is pivotally mounted to the main frame on a normally vertical steering axis, the front subframe carrying working apparatus such as a loading scoop, and mechanism for raising, lowering and tilting the scoop. The main frame carries the operator's seat, engine and fluid pump, the rear subframe carrying the main frame, fluid operated motor and drive connections, including power transmission gearing, to the front and rear drive wheels.

1 Claim, 7 Drawing Figures

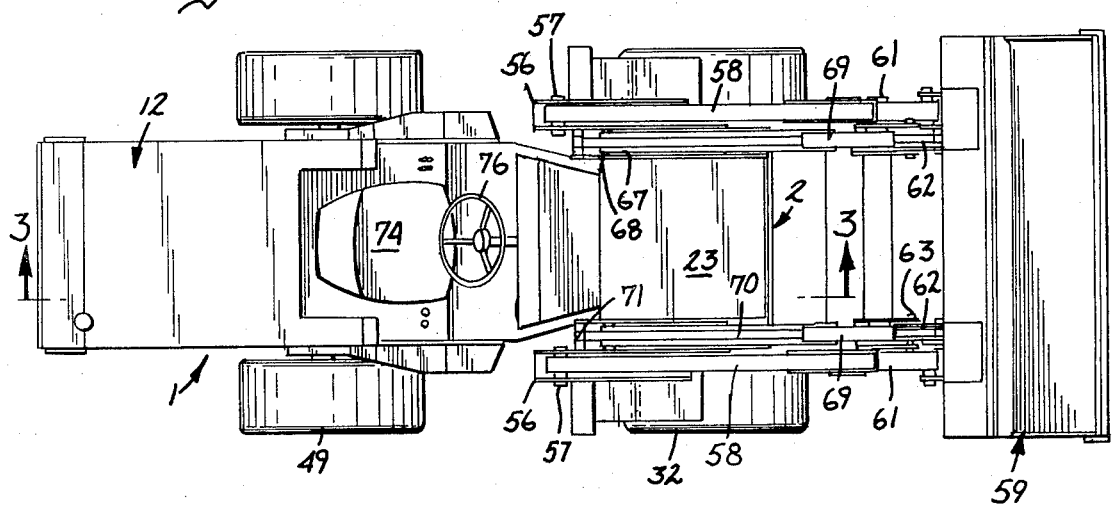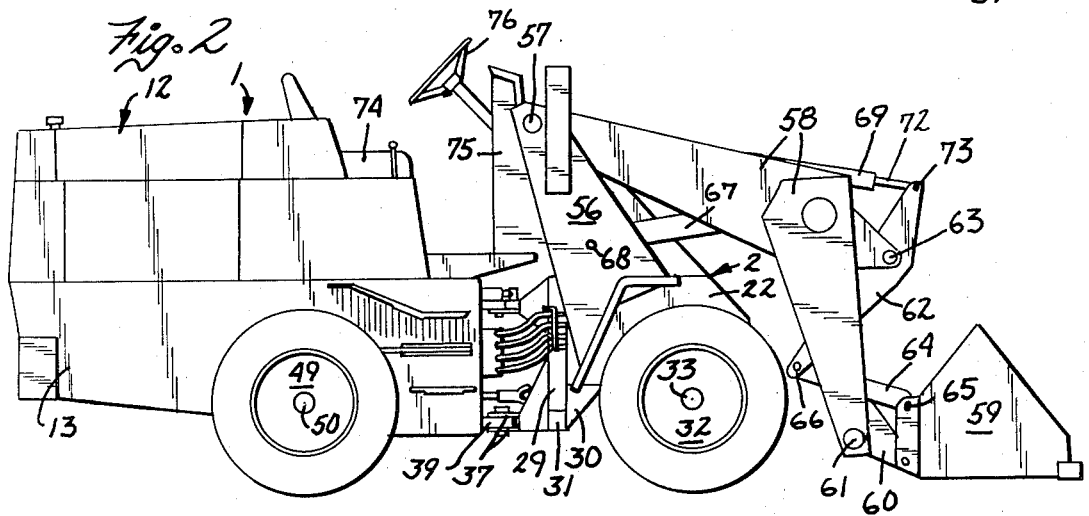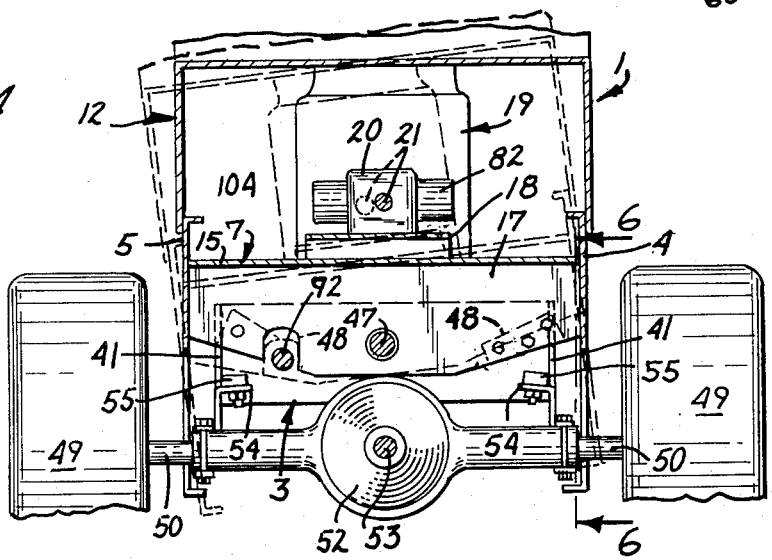

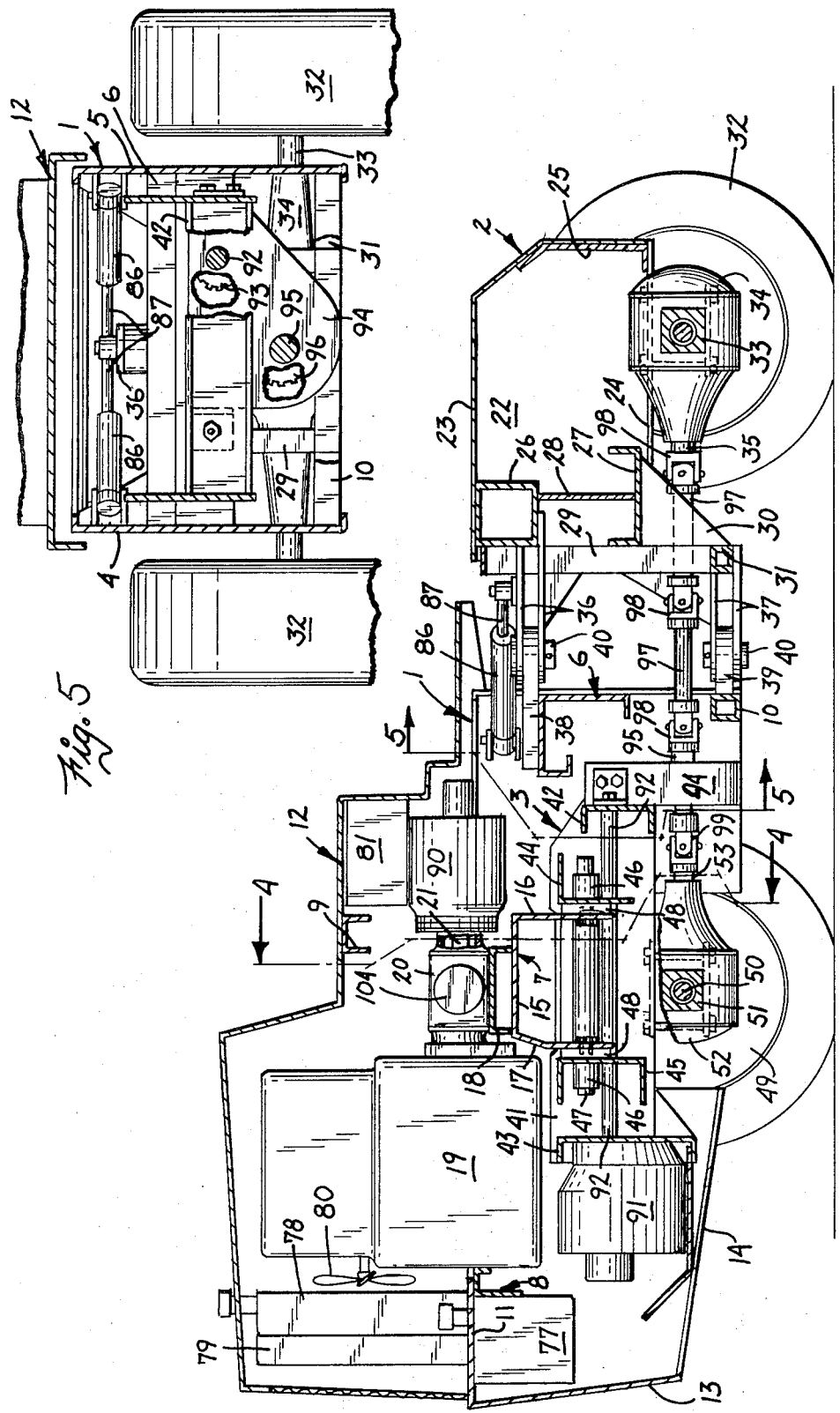

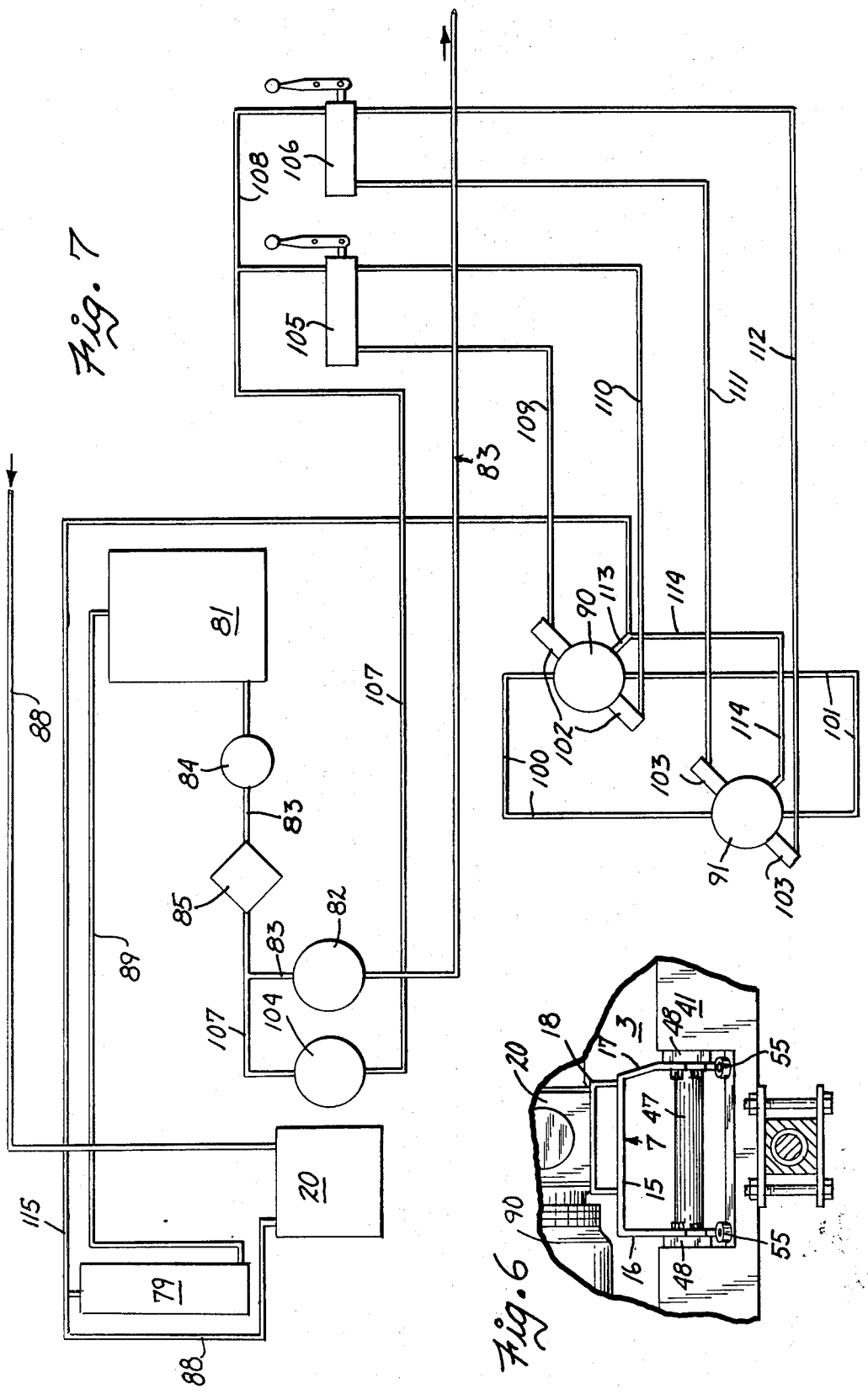

ARTICULATED LOADER

BACKGROUND OF THE INVENTION

Articulated vehicles are well known and are used for several purposes in road and heavy construction work. These vehicles are usually of large size and very expensive to produce, having intricate drive and control means and being massive in construction.

SUMMARY OF THE INVENTION

An important object of this invention is the provision of an articulated loader which is compact in size and simple and rugged in construction, easily controlled and manueverable in restricted areas, and relatively inexpensive to produce. To this end, the loader of this invention comprises a main frame pivotally mounted on a rear subframe on a normally horizontal axis extending generally longitudinally of the direction of travel of the loader. A front subframe is pivotally connected to the front end of the main frame on a normally vertical steering axis, the front and rear subframes being carried by respective front and rear pairs of drive wheels. The front subframe carries power operated loading equipment, the main frame carrying an engine, fluid pumps drive by the engine, a radiator, fluid cooler, fuel and oil tanks, an operator's seat and a control console. The rear subframe carries, in addition to the main frame, a fluid pressure operated motor, a drive shaft coupled to the motor, transmission gearing connected to the drive shaft and flexible or articulated shafts for driving the front and rear drive wheels. The engine, radiator and fluid cooler, fuel tank and fluid pressure operated motor, are diposed rearwardly of a vertical plane coincident with the axis of the rear drive wheels to partially counterbalance the weight of the front subframe and parts carried thereby, so that when the equipment carried by the front frame is placed under heavy lifting load, the rear wheels will stay on the ground. The hydraulic liquid used in the pumps and fluid pressure operated motor, as well as other fluid powered apparatus on the machine, is a lubricant for gearing between the engine and pump; and all of the hydraulic liquid passes through the cooler during operation of the machine to maintain the liquid at a satisfactory running temperature.

DESCRIPTION OF THE DRAWINGS

FIG. 1 is a view in top plan of an articulated loader produced in accordance with this invention;

FIG. 2 is a view in side elevation;

FIG. 3 is an enlarged longitudinal section taken substantially on line 3—3 of FIG. 1, some parts being removed;

FIGS. 4 and 5 are fragmentary transverse sections taken substantially on the lines 4—4 and 5—5 respectively of FIG. 3;

FIG. 6 is a fragmentary section taken substantially on the line 6—6 of FIG. 5; and FIG. 7 is a schematic hydraulic diagram.

DETAILED DESCRIPTION OF THE PREFERRED EMBODIMENT

The articulated loader of this invention involves frame structure including a main frame indicated generally at 1, and front and rear subframes 2 and 3 respectively. The main frame 1 includes a pair of laterally spaced vertically disposed side frame members 4 and 5, front, intermediate and rear cross-frame members 6, 7 and 8 respectively, a transverse brace member 9, other cross-members 10 and 11, and top, rear and bottom cover members 12, 13 and 14 respectively. The intermediate cross frame member 7 includes a horizontal upper wall 15 and generally vertically disposed front and rear wall elements 16 and 17 respectively. A channel-like mounting member 18 is supported on the top wall 15 and, together with the rear cross-frame member 8, aids in supporting an internal combustion engine 19 shown diagrammatically in FIGS. 3 and 5. The channel member 18 underlies and directly supports a gear box or transmission housing 20 secured to one end of the engine 19 and transmission gearing, not shown but contained within the housing 20 and driven by the engine 19 and terminating in a drive shaft 21, see FIGS. 3 and 5.

The front subframe 2 includes laterally spaced side wall members 22, top and bottom wall members 23 and 24, a front cross-frame member 25, a rear rectangular cross-frame member 26, a transverse channel member 27, a plate-like cross-brace member 28 and a pair of laterally spaced upright frame members 29 welded or otherwise rigidly secured to the members 26 and 27. The members 29 are braced by gussets 30 welded thereto and to the channel member 27, one of the gussets 30 being shown in FIG. 3. The lower ends of the upright frame members 29 are connected by a horizontal member 31.

The front subframe 2 is supported by a pair of laterally spaced pneumatic tire equipped front drive wheels 32 mounted on aligned drive shafts 33 journalled in an axle housing 34 rigidly secured to the front subframe 2. The inner ends of the shafts 33 are operatively connected, within a differential gear housing 34, to an input shaft 35 extending rearwardly outwardly from the differential gear housing 34, by conventional differential gearing, not shown but contained in the housing 34. The gearing within the housing 34 is of well known structure, and in and of itself does not constitute the instant invention. Hence, detailed showing and description thereof is omitted, in the interest of brevity.

The front subframe 2 is provided with upper and lower pairs of vertically spaced connector arms 36 and 37 respectively between each pair of which is received the front end of a respective one of a pair of upper and lower mounting bars 38 and 39 that project forwardly from the cross-frame members 6 and 10 respectively. The arms 36 and 37 are pivotally secured to their respective bars 38 and 39 by vertically aligned pivot pins 40, for steering movements of the main frame 1 and front subframe 2 relative to each other.

The rear subframe 3 comprises a pair of laterally spaced side walls 41 connected at their front and rear ends by front and rear channel members 42 and 43 respectively, and intermediate their ends by intermediate cross-frame members 44 and 45. As shown in FIG. 3, the cross-frame members 44 and 45 are disposed in closely spaced relation to the front and rear walls 16 and 17 respectively of the intermediate cross frame members 7, the members 44 and 45 having aligned bearings 46 which journal a mounting shaft 47 rigidly mounted in the intermediate cross-frame member 7 and disposed on a generally horizontal axis extending longitudinally of the direction of movement of the loader. Pairs of wear plates 48 are interposed between the front wall 16 and cross-frame member 44 and between the rear wall 17 and its adjacent cross-frame member 45, the wear plates 48 being bolted or otherwise releasably secured to the walls 16 and 17 and having sliding engagement with their adjacent members 44 and 45 during pivotal movement between the main frame 1 and rear subframe 3.

A pair of pneumatic tire equipped rear drive wheels 49 are each mounted on the outer end of a different one of a pair of aligned rear axles of shafts 50 that are jounalled in a rear axle housing 51 rigidly secured to the opposite side walls 41 of the rear subframe 3. The axle housing 51 is similar to the axle housing 31, being formed to provide a differential gear housing 52 intermediate its ends and having an input shaft 53 projecting forwardly therefrom. Although not shown, it may be assumed that the input shaft 53 is operatively coupled to the shafts or axles 50 by the usual differential gearing contained within the differential housing 52.

As shown in FIGS. 4 and 6, the side walls 41 of the rear subframe 3 are formed to provide inturned flanges or ledges 54 on which are mounted rubber cushions 55 that are positioned to engage lower edges of the walls 16 and 17 to yieldingly limit relative pivotal movement between the main frame 1 and rear subframe 2 on the axis of the shaft 47.

The front subframe 2 includes a pair of laterally spaced upright legs 56 to the upper ends of which are pivotally mounted, by means of aligned pivot pins 57, the innder ends of a pair of generally L-shaped booms 58. A generally forwardly opening scoop 59 is provided with a pair of rearwardly projecting arms 60 that are pivotally connected to the outer ends of the booms 58, on aligned axes as indicated at 61. The scoop 59 is also connected to the booms 58 by a pair of levers 62 that are pivotally secured intermediate their ends to the booms 58, as indicated at 63, and a pair of rigid links 64 pivotally secured to the scoop 59 and to one end of the levers 62, as indicated at 65 and 66 respectively. The booms 58 are raised and lowered by hydraulic cylinders 67 each pivotally secured at one end to a different one of the legs 56, as indicated at 68, and cooperating piston rods, not shown, but which may be assumed to be connected to the booms 58 in the well known manner of devices of this type. Tilting movements are imparted to the scoop 59 by means of a pair of hydraulic cylinders 69 that are mounted on mounting rods 70 secured at their inner ends to the inner end portions of the booms 58, as indicated at 71, and cooperating piston rods 72 each connected to a different one of the levers 61 as indicated at 73.

The scoop 59, mounting means therefor, and the fluid pressure apparatus for moving the booms 58 and scoop 59 are of well known construction, and in and of themselves do not comprise the instant invention. Hence, further detailed showing and description thereof is omitted. It should suffice to state that operation of the scoop 59 is controlled from an operator's seat 74 mounted on the top cover member 12, as is a conventional control console 75 directly in front of the operator's seat 74. In FIGS. 1 and 2, a steering wheel is shown and indicated at 76.

Fuel, such as gasoline, is supplied to the internal combustion engine 19 from a fuel tank 77 that is supported from the rear cross-frame member 8 and cross-member 11 is a suitable manner. Also supported by the cross-member 11 is a radiator 78 for engine coolant, and an oil cooler 79, the radiator 78 and oil cooler 79 being disposed in the path of cooling air drawn into the interior of the main frame in the usual manner by a fan 80 driven by the engine 19.

Hydraulic fluid is delivered to the cylinders 67 and 69 from an oil reservoir 81 by means of a pump 82 mounted on the transmission housing 20 and driven by the gearing within the transmission housing in the usual manner. The pump 82 is connected to the reservoir 81 by a conduit 83 in which is interposed a shut-off valve 84 and a conventional filter 85. The conduit 83 is shown in the diagram of FIG. 7 and may be assumed to extend to control valves, not shown, but disposed near the operator's seat 74. It may be further assumed that the conduit 83 is contained in a steering circuit that includes a pair of hydraulic cylinders 86 pivotally mounted one end in the main frame 1 and having cooperating piston rods 87, the outer ends of which are pivotally mounted on one of the arms 36. Preferably, the steering cylinders 86 are controlled by the steering wheel 76 is a well known manner to impart relative steering movements between the main frame 1 and front subframe 2 on the common axis of the pivot pins 40. The hydraulic circuit to the front end and steering portions of the loader includes a return conduit 88 that extends to the transmission housing 20 and from thence to the cooler 79. From the cooler 79, oil is delivered to the reservoir 81 through a conduit 89. With the above arrangement the oil from the steering and loading mechanisms is used as a lubricant for the bearing contained within the housing 20, the oil being maintained at a satisfactory operating temperature by passing through the cooler 79.

For the purpose of imparting driving rotation to the front and rear drive wheels 32 and 49, a hydraulic drive mechanism is utilized, the same comprising a variable displacement pump 90 operatively coupled to the drive shaft 21, and a variable displacement fluid operated motor 91. The pump 90 is suitably mounted on the main frame 1, the motor 91 being mounted on the rear channel member 43 of the rear subframe 3. The hydraulic motor 91 is provided with an output shaft 92 that is connected to a drive pinion 93 disposed within a transmission gear box 94, commonly known as a drop box. The drop box 94 is mounted on the front channel member 42 of the rear subframe 3 and journals an output shaft 95 that extends both forwardly and rearwardly of the drop box 94. Speed reduction gearing within the drop box 94 includes the pinion 93 and an output gear 96 on the output shaft 95 for imparting rotation to the shaft 95 responsive to operation of the motor 91. The shaft 95 is operatively coupled to the input shaft 35 of the differential gearing within the housing 34 by means of a flexible shaft including shaft sections 97 and a plurality of universal joints or couplings 98. The rearwardly projecting portion of the output shaft 95 is operatively coupled to the rear input shaft 53 of the differential gearing within the housing 49 by a universal joint or coupling 99. With this arrangement, both pairs of drive wheels 32 and 49 are driven simultaneously by the hydraulic drive motor 91.

The variable displacement pump 90 and fluid pressure operated motor 91 are commercially available and of a type generally used for driving vehicles or imparting rotary movement to various mechanisms and are controlled as to displacement, whereby to vary the speed of the output shaft 92, by hydraulic means including valves and servo mechanisms. The pump 90 and motor 91 are connected in a more or less closed circuit including conduits 100 and 101. In the diagram of FIG. 7, conventional servo mechanisms are indicated diagrammatically at 102 on the pump 90 and at 103 on the motor 91. Operation of the servo mechanisms 102 and 103 are effected by a hydraulic pump 104 operatively connected to the gearing within the transmission housing 20, and a pair of manually operated control valves 105 and 106. Oil is delivered to both valves 105 and 106 by the pump 104 through a conduit 107 that is connected to the conduit 83 between the pump 82 and filter 85, the conduit 107 being connected to the valve 105 and having a branch 108 leading to the valve 106. A pair of conduits 109 and 110 connect the valve 105 to respective ones of the servo mechanisms 102, and another pair of conduits 111 and 112 connect the valve 106 to respective ones of the servo mechanisms 103. The arrangement is such that the vave 105 is used primarily as a reversing valve, the valve 106 being used to control the speed of the output shaft 92.

The pump 104 not only serves to cause operation of the servo mechanisms 102 and 103, but also operates to charge the circuit comprising the pump 90, motor 91, and conduits 100 and 101 with a predetermined fluid pressure. A predetermined leakage exists between the servo mechanism 102 and its pump 90, and the servo mechanisms 103 and the motor 91, so that fluid is pumped to the pump 90 and motor 91 whenever the internal combustion engine 19 is in operation. In order to maintain a predetermined flow of charging liquid through the pump 90 and motor 91, the same are provided with return conduits 113 and 114 respectively which are connected to a main return conduit 115 communicating with the oil cooler 79. Thus, a constant flow of charging liquid is maintained in the drive circuit and control therefor, the liquid being cooled prior to its return to the reservoir 81.

The above described circuitry includes valve means, such as pressure relief valves, pilot valves and chack valves, which, in and of themselves, do not comprise the instant invention. Hence, showing and description of such valves as well as gauges which indicate operating conditions to the operator, are omitted.

It will be noted that the main frame 1 and subframes 2 and 3 are all very compact and closely coupled, in order that the loader may occupy a minimum of space and operate in very close quarters otherwise inaccessible to the large present day articulated machinery. By placing as many portions of the operating mechanism as possible behind a vertical plane coincident with the axis of the rear wheels 49, a sufficient portion of the weight of the machine is located so as to counterbalance the normal loads to which the loader mechanism including the scoop 59 may be subjected.

While I have shown and described a preferred embodiment of articulated loader, it will be understood that the same is capable of modification, and that modification may be made without departure from the spirit and scope of the invention, as defined in the claims.

I claim:

1. An articulated loader comprising:
   a. frame means including a main frame and front and rear subframes;
   b. front and rear pairs of laterally spaced ground engaging drive wheels supporting said front and rear subframes respectively;
   c. means connecting said front subframe to said main frame for relative pivotal movements on a generally vertical axis only between said main frame and front subframe;
   d. means mounting said main frame on said rear subframe for swinging movement of said rear subframe relative to said main frame and front subframe on a generally horizontal axis extending forwardly and rearwardly of said main frame and rear subframe;
   e. an engine, a gear box connected to said engine, pump means connected to said gear box, a driver's seat, and control means including a console, mounted on said main frame;
   f. a fluid pressure operated motor and cooperating transmission mechanism mounted on said rear subframe, said transmission mechanism including drive shaft means operatively connected to said front and rear pairs of drive wheels;
   g. flexible conduit means connecting said pump means and motor;
   h. said main frame and rear subframe including transverse wall elements having widely spaced side edges and disposed in spaced parallel relationship;
   i. and a pair of circumferentially spaced plate-like wear members releasably mounted on one of said wall elements each adjacent a different side edge thereof and having sliding engagement with the other of said wall elements responsive to relative pivotal movement between said main frame and rear subframe.

* * * * *